United States Patent [19]

Knudsen

[11] Patent Number: 5,224,287
[45] Date of Patent: Jul. 6, 1993

[54] RATTRAP

[76] Inventor: Henrik M. Knudsen, Er-Rodent ApS, Sjaellandsgade 119 Aarhus, Denmark

[21] Appl. No.: 803,072

[22] Filed: Dec. 6, 1991

[30] Foreign Application Priority Data

Apr. 6, 1989 [DK] Denmark .............................. 1653/89
Nov. 30, 1989 [DK] Denmark .............................. 6036/89

[51] Int. Cl.⁵ .............................................. A01M 23/30
[52] U.S. Cl. .............................................. 43/81; 43/75
[58] Field of Search ..................... 43/81, 83.5, 58, 124, 43/121, 75, 99, 78

[56] References Cited

U.S. PATENT DOCUMENTS

| | | | |
|---|---|---|---|
| 2,139,674 | 12/1928 | Evans | 43/75 |
| 3,638,348 | 2/1972 | Lusk | 43/75 |
| 3,815,278 | 6/1974 | Beaton et al. | 43/99 |
| 4,349,980 | 9/1982 | McKee | 43/81 |
| 4,411,094 | 10/1983 | Spackova et al. | 43/121 |
| 4,477,997 | 10/1984 | Bumgarner | 43/58 |
| 4,483,094 | 11/1984 | McKee | 43/75 |
| 4,854,073 | 8/1989 | Ball | 43/75 |

Primary Examiner—Richard K. Seidel
Assistant Examiner—Chuck Y. Mah
Attorney, Agent, or Firm—Antonelli, Terry, Stout & Kraus

[57] ABSTRACT

A rattrap installation which includes a detector as well as power driven executing member for performance of successive operations after an automatic removal of previously executed rats. A device is provided for releasing a bait scent for a predetermined period of time and a steep climbing element extends vertically downwardly from the trap and has a length of several times a body length of the fully grown rat. The executing member is disposed at a position corresponding to a location of a neck region of the rat when a nose of the rat is located in a release area of a bait scent. A built-in energy source is provided in the trap for enabling an activation of the executing member a large number of times.

5 Claims, 1 Drawing Sheet

RATTRAP

CROSS-REFERENCE TO RELATED APPLICATIONS

This application is a continuation application under 35 USC 365(c) and 35 USC 120 of International Application No. PCT/DK90/00088, filed Apr. 6, 1990 based on Danish Applications 1643/89 filed Apr. 6, 1989, and 6036/89, filed Nov. 30, 1989, as filed in the United States Patent and Trademark Office on Oct. 7, 1991.

SUMMARY OF THE INVENTION

The present invention relates to a rattrap with a detector controlled, powered executing member for successive operations after automatic removal of every previously executed rat.

BACKGROUND OF THE INVENTION

Traditional, effective springpowered traps need manual loading after every operation, with the traps severally requiring removal of the executed rat, renewal of the bait in the trap, and retightening of the executing member. For large scale rat control, for example, with respect to sewage rats, the above mentioned traps are hopelessly inapplicable, therefore in practice, control is attempted by laying down of rat poison. This often takes place in precarious environments, for example, at or in the immediate vicinity of food manufacturing companies, which is not very ideal.

Ideally an effective extermination should only be effected by the use of mechanically operated traps, but these must then be operable several or many times without necessitating reqular supervision. Traps of this type have already been proposed in, see for example, U.S. Pat. No. 4,554,524, but for various reasons have not gained any acceptance in practice. The proposed traps suffer from so many disadvantages that they are in fact unusable in as much as detection of a rat is extremely uncertain as a rat must actuate a detector or member in a specific direction, removal of the rats after each execution is limited to collecting them in a drawer or container beneath the trap, which, in practice, means a great restriction of the possibilities for the gathering or removal of large numbers of exterminated rats, execution of the rats takes place by a transverse movement of a transverse brace against a sideplate portion of the trap, whereby execution of the rats can very well be connected with an injury and an associated undesirable release of blood, and totally unacceptable pains for the animal, as it will be entirely coincidental where the transverse-brace hits the body of the animal, and only a small number of rats can be executed between each supervision of the trap, since the bait used can be eaten by the first rat to visit the trap.

There have been other proposals such as in, for example, U.S. Pat. No. 3,638,348 and WO 82/00568, where even more disadvantages have been encountered, not the least regarding the removal of the previously executed rats so that there after each or only very few activations there is barely room for the entrance of more rats into the trap, an similarly the method of execution is coincidental and extremely brutal.

SUMMARY OF THE INVENTION

Thus, the invention aims at providing a trap installation of extremely increased efficiency, whereby the trap, without supervision, for example, by installation in a sewage system, is capable of effecting not only a few, but several hundred executions, such that it is a question of a professional trap of great significance, while the known automatic traps have been practically for household use only and totally without possibility for larger scale rat control. What has here been relied upon is the said putting down of poison which is in many aspects extremely unfortunate.

According to the present invention, a rat trap installation having a control detector and a power driven executing member for the performance of successive operations after an automatic removal of each previously executed rat is provided, wherein the rat trap is fitted with a container for release of a bait in the form of a scent for a predetermined period of time such as, for example, a week, a month, etc., with the bait delivery source being disposed overhead a steep climbing element, preferably, a climbing rope hanging vertically down from the trap and having a height of several times the body length of a fully grown rat. The detector is mounted in conjunction with or immediately beneath the source of the bait or the delivery level thereof, with an executing member being positioned just beneath the detector means so as to correspond to a location of the neck region of the rat. When the nose of the rat is located at a release area of the bait, the trap, having a built-in energy source activates the executing member and, advantageously, the energy source is constructed so as to enable, for example, at least 50 to 100 operations of the trap.

By virtue of the above noted features, it is possible to provide a trap which is alluringly operative over a long period of time inasmuch as the animals cannot remove the bait and a high number of killed animals can be removed from the trap area by simply falling down a relatively long distance from the trap area so that there will be plenty of space for access by new animals.

Advantageously, in accordance with further features of the present invention, the release area of the bait is an area in an upper end of a downwardly open receiving housing for the head and neck of the rat, with the executing member being in the form of a striker bar mounted transversely movably near the lower end of the housing.

The striker bar, according to the present invention, on activation, is driven from a side area wherein there is an opening immediately in front of the striker bar.

The detector utilized in the present invention may be of a type with a low current consumption such as, for example, a light diode, and an associated control unit is provided which is adapted to supply the detector in an intermittent manner such that the detector is only briefly operative in each potential detection.

The steep climbing element, preferably, a climbing rope is suspended in an interrupter that renders the trap inoperative when the climbing rope exhibits a weight equivalent to a load less than a weight of a fully grown rat.

It is essential for the invention that the execution of the animals is as reliable and humane as possible, and this effect is obtained by the active area of the trap being shielded in such a way that the only access to the area is so that the intruding rat can conduct its head up into the area until the nose is by or nearly by the delivery source of the bait, whereby the detector means will first then detect the arrival of the animal. The executing member is a transversely movable bar positioned in just such a level that in the mentioned situation it is aligned with the rat's neck region, and this bar is made to make a fast and powerful blow against the neck region, preferably towards a lateral support, which has an opening just opposite to the bar, so that the neck is broken effectively without being crushed. Thus the rat cannot enter the trap "incorrectly", and the blow is only released when the rat is in the correct position. After the blow there is nothing to prevent the rat falling down when it releases its grip on the climbing element, thus immediately making room for the next visit.

A typical place of installation would be a ceiling area in a sewer pipe, and at such a place the climbing path will not have to be overly long as the falling rats can be carried away by the sewer water current.

The activation system of the executing bar may, in principle, be power supplied from an external power supply such as the electricity mains, since typically the mounting places will be rather isolated, for example, in sewers, it is highly preferable that the trap has its own power supply. Preferably a pressure gas system with a gas bottle of $CO_2$ in liquid state is used, while for the detection of the animals and the control of the release of the executing bars electricity from an accumulator is used. These energy sources should have sufficient capacity for an effective activation of the trap a relatively large number of times, preferably more than 50-100 times, for example, 250-500 times. This also applies to the bait that correspondingly ought to be effective during the relevant operative time period; however, this will of-course be dependant of the visiting frequency at the trap.

BRIEF DESCRIPTION OF THE DRAWINGS

In the following the invention is explained in greater detail with reference to the drawings wherein.

DETAILED DESCRIPTION

Figure 1:
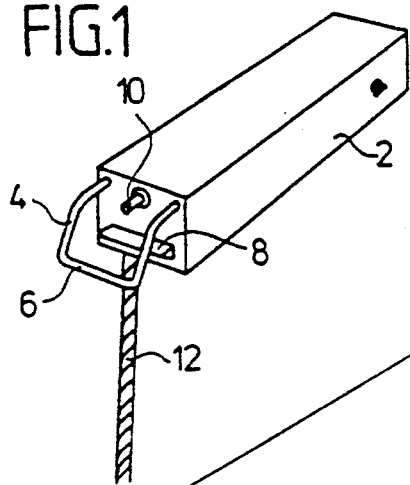
FIG. 1 is a schematic perspective view of a rattrap according to the invention.

The trap shown in FIG. 1 includes an apparatus box 2 made, for example, of stainless steel, that, on one end, has a downwardly projecting, bent hoop 4 with a lower horizontal portion 6. At the end of 2 there box the is a striker bar 8 positioned at a level with or a little above the lower hoop portion 6, with the pressure bar being mounted on a projector system operable to shoot forward, impactwise, the bar 8 towards the lower hoop portion part 6. Above the striker bar 8 there is mounted on the box end a protruding pin 10 forming a part of a bait source that is a combined scent source and actuator for the projector system. Beneath the box end is suspended the upper end of a climbing rope 12.

The trap is mounted under the upper surface of a sewage pipe or otherwise in an elevated position in the desired locality, preferably, so that the rats have difficulty approaching the trap from above. The rope 12, which can be substituted by a ladder or a plank, is placed so as to hang downwards to a suitable access area. A sent is released through the pin 10 with a scent being, supplied from a tank in the box 2.

A visiting rat that is attracted by the bait source from the pen 10, will naturally, after climbing up the rope 12 place its head in the space between the hoop portion 6 and the striker bar 8, and the apparatus is constructed so that the neck vertebrae will be in this area when the nose or mouth reaches the pen 10. When touching the pin 10 the rat activates the projector system, which immediately makes the striker bar 8 shoot forward towards the hoop 6, so that the neck of the rat is broken effectively and momentarily. Soon there after the striker bar 8, is pulled back, whereby the trap is immediately ready for the next visit.

Figure 2:
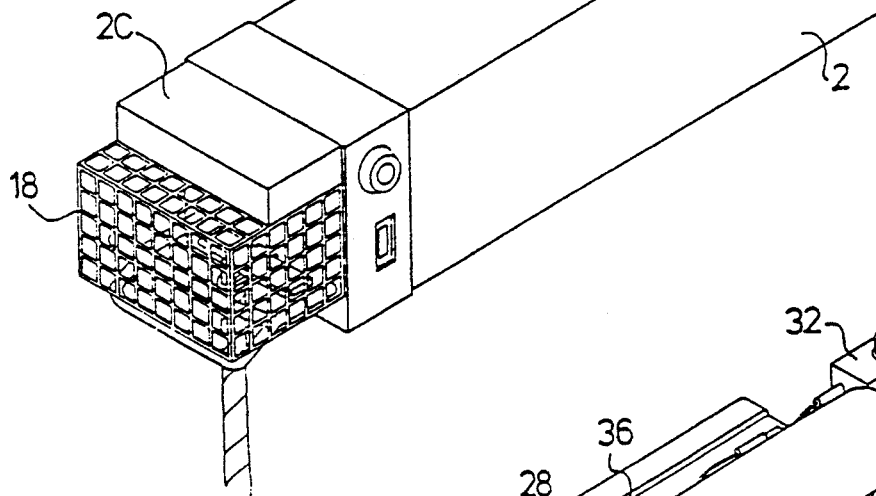
FIG. 2 is a detailed perspective view of a preferred embodiment of the present invention.
Figure 3:
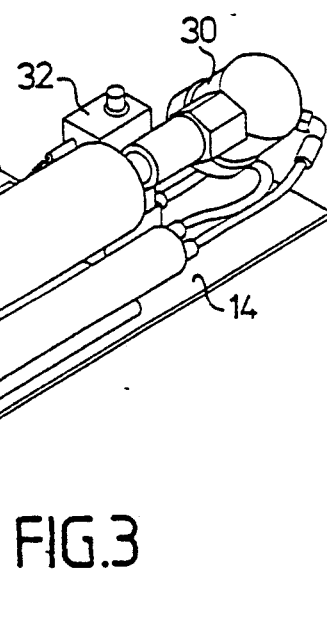
FIG. 3 is a perspective view of the rat trap of the present invention with certain parts removed.
Figure 3:
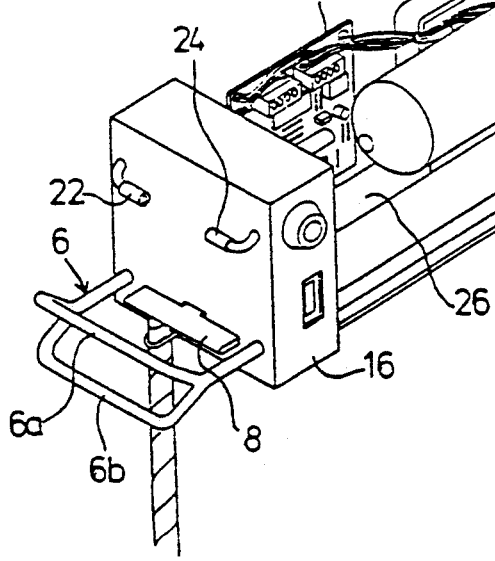

The functions in question can be controlled in many different ways, and the trap shown in FIGS. 2 and 3 is but a practical example. The apparatus box 2 is pushed in as a cover over a chassis plate 14, on which the activation parts of the trap are mounted, and which the striker bar 8 and the hoop 6 protrude. The latter is bifurcated on its outer part, with the portions 6A and 6B being respectively located above and below the plane of projection of the striker bar 8. Hereby, it is ensured that the animals are executed extremely effectively by the breaking of their necks, but without the neck skin bursting that is without any resulting bloodshed.

The active end area of the trap is covered by a downwardly open net screen 18, at the top of which there is mounted a container 20 for bait, which can effuse or otherwise reveal itself through the bottom of the container.

As shown in FIG. 3, for the detection of rat visit, use is made of a photoelectric cell or photodiode 24, which activates the striker bar 8 when the nose of the rate gets close to the container 20.

The bar 8 is mounted on a piston rod of a cylinder 26, which is supplied with pressurized gas from a gas cylinder 28 through a reduction valve 30 and a solenoid valve 32. The latter is controlled from a control unit 34, which is connected with the photo cell 24 and with and accumulator or battery 36. The control unit 34 is adapted to actuate the solenoid valve 32 which is activated for a suitable time period by each actuation of the photo sensor, such that the bar 8 can fulfill its objective by the associated activation of the cylinder 26. A spring (not shown) is responsible for thereafter retracting the piston rod back to the start position, now with the possibility of bleeding the cylinder 26 through a bleeding hole in the valve 32. The gas cylinder can suitably contain carbon-dioxide, thus allowing the use of a smaller standard cylinder containing sufficient energy for several hundred activations of the trap. The selected battery or accumulator 36 should of course have suitably corresponding capacity. This also applies to the bait container 20.

It will be practical that the entire contents of the box are arranged as a single unit, which is retractable from the box, so that, for loading the trap, the entire contents can be exchanged for a new and loaded unit. As a safety precaution a switch can be mounted on the box, usable for making the trap inoperative.

The trap can also be provided with a counter for counting the number of operations, but, where possible, the counter may be mounted externally, so that the progress can be monitored, and for enabling, for example, a determination of the time period for reloading the trap. Despite the photodiode 22 not using much current it would nevertheless be a noticeable load for the battery when it is operating constantly, for example through a period of several months. However, in connection with the invention it has been realized that current consumption can be reduced appreciably by an intermittent operation of the photo diode 22, in that the photo diode 22 is well suited, with the aid of an electronic control unit, to be switched on and off in a manner such that photodiode 22 is lit only for a short moment during such period of time that would typically be sufficient for the detection of a rat visit, for example, a half or a whole second if, during such periods it is ensured that only a very brief flash from the diode is produced this will be sufficient for an effective detection. These flashes do not necessarily have to be for longer periods than approximately one millisecond, that is only a very short part of the time period and, accordingly, the battery is loaded to a very small degree only.

It will be a further possibility that some of the energy released at every activation of the energy source in the trap can be used for a small recharging of the battery, for example, by energy impulses derived from an induction coil that is activated by a permanent magnet mounted in connection with the rod 18 that drives the bar 8 to and fro.

With the present invention it is a further proposed that in connection with the suspension of the access rope 12. A weighing cell can be mounted, by means of which it can be ensured that the striking mechanism cannot be triggered unless the access rope 12 is loaded with the weight of at least one fully grown rat. This ensures against certain possible unintended actuations.

It is furthermore suggested that the bait or scent released slowly and continously from the container 20, at predetermined intervals, is controlled to be released at an increased rate, even with the result that drops of the scent are released and fall down, whereby the scent more powerfully will draw the attention of the rats to the presence of the bait above. The increased dosages, of course, can be caused by many different controlled methods, but it could be both suitable and sufficient that greater dosages are released as a function of each activation of the trap, for example in that by each activation a small volume of the pressurized gas is lead into a scent container 16.

It should be emphasized that the bait is not just a "threat", that can be removed, but a constantly present odor that imitates for example, fresh or smoked meat or even a fruit concentrate, preferably, with sugar added to the mixture used. It has been found to be important that the allurement is adapted to the environment in which the rats live, for example, a vicinity of a particular type of food factory.

What is important for the invention is that the trap is sufficiently effective over a long period of time to be used in the overall campaign against rats and not just for the extermination of a few animals in places that are wished to be free of rats. On this basis the eventual detailed make-up of the trap is of less significance for the invention, and other means of detection and activation can satisfactorily be used, thus the detection of the visit of the animals could optionally be effected by a meat detection or a capacitive or other non-tactice detection, and possibly electromagnetic energy or explosion energy could be used for the activation of the executing bar.

I Claim:

1. A rattrap installation comprising:
   a detector;
   a power driven executing member for performing successive operations after an automatic removal of previously executed rats;
   a container including a means for releasing a bait scent for a predetermined period of time;
   a steep climbing element extending vertically downwardly from the trap, said means for releasing the bait scent being disposed above said steep climbing element;
   wherein the detector is mounted in connection with or immediately beneath the means for releasing the bait scent or a delivery level thereof,
   said executing member is horizontally positioned beneath the detector at a position corresponding to a location of a neck region of a rat when a nose of the rat is located at a release area of the bait scent, and
   wherein a built-in energy source is provided in the trap for enabling an activation of the executing member for at least 50-100 operations of the trap.

2. A rattrap according to claim 1, wherein the release area of the bait is in an area in an upper end of a downwardly open receiving housing for a head and the neck region of a rat, and wherein the executing member is a striker bar transversely movably mounted near a lower end of the receiving housing.

3. A rattrap according to claim 2, wherein the striker bar upon activation is driven from a sidearea of said receiving housing, and wherein an opening is provided immediately in front of the striker bar.

4. A rattrap according to claim 2, wherein the detector includes a photo diode, and wherein a control unit is connected to the photo diode and is adapted to supply power to the detector in an intermittent manner such that the photodiode is only briefly operative during potential detection periods.

5. A rattrap according to claim 2, wherein the steep climbing element includes a climbing rope suspended in an interrupter for rendering the trap inoperative when the climbing rope does not provide a predetermined tension.

* * * * *